US012578102B2

(12) United States Patent
Martin

(10) Patent No.: US 12,578,102 B2
(45) Date of Patent: Mar. 17, 2026

(54) PERSONAL AND PORTABLE MISTING DEVICE

(71) Applicant: Christopher Sean Martin, Aurora, CO (US)

(72) Inventor: Christopher Sean Martin, Aurora, CO (US)

(*) Notice: Subject to any disclaimer, the term of this patent is extended or adjusted under 35 U.S.C. 154(b) by 564 days.

(21) Appl. No.: 17/972,775

(22) Filed: Oct. 25, 2022

(65) Prior Publication Data

US 2024/0133563 A1 Apr. 25, 2024
US 2024/0230115 A9 Jul. 11, 2024

(51) Int. Cl.

*F24F 5/00* (2006.01)
*B05B 7/00* (2006.01)
*B05B 7/24* (2006.01)

(52) U.S. Cl.

CPC .......... *F24F 5/0035* (2013.01); *B05B 7/0075* (2013.01); *B05B 7/2491* (2013.01); *F24F 2221/12* (2013.01); *F24F 2221/38* (2013.01)

(58) Field of Classification Search

CPC . F25D 2331/806; B05B 7/2491; B05B 3/022; B05B 15/06; F24F 2221/12; F24F 2221/38

See application file for complete search history.

(56) References Cited

U.S. PATENT DOCUMENTS

| | | | | |
|---|---|---|---|---|
| 707,905 A * | 8/1902 | Conover | B67D 3/0029 | |
| 1,287,046 A * | 12/1918 | Knapp | G01F 11/266 | 222/509 |
| 2,204,524 A * | 6/1940 | Bender | B65D 47/06 | 222/571 |
| 4,798,060 A | 1/1989 | Long | | |
| 5,295,369 A * | 3/1994 | Garcia | F25D 3/08 | 62/530 |
| 5,330,104 A * | 7/1994 | Marcus | F24F 1/0007 | 239/266 |
| 6,112,538 A | 9/2000 | Strussion | | |
| 6,182,463 B1 | 2/2001 | Strussion | | |
| 6,257,501 B1 * | 7/2001 | Roach | F24F 5/0035 | 239/289 |
| 6,789,787 B2 | 9/2004 | Stutts | | |

(Continued)

FOREIGN PATENT DOCUMENTS

| | | |
|---|---|---|
| WO | 9962328 A1 | 12/1999 |
| WO | 2006110022 A1 | 10/2006 |

OTHER PUBLICATIONS

Ida, N. Sensors, Actuators, and Their Interfaces—A Multidisciplinary Introduction, 2nd ed. Institution of Engineering and Technology , 2020. p. 629 (Year: 2020).*

(Continued)

*Primary Examiner* — Elizabeth J Martin
*Assistant Examiner* — Keona Lauren Banks
(74) *Attorney, Agent, or Firm* — Leyendecker & Lemire, LLC

(57) ABSTRACT

A personal and portable misting device having at least a pump unit operatively coupled to an inlet tube and an outlet tube with a misting nozzle attached to the outlet tube is described. The inlet tube includes a distal end that is to be coupled to a water source. The distal end has a plug attached to it that is designed to be received in the end of a drain spout of a hard-sided cooler to utilize the melted ice-water typically contained in the cooler as the water source.

19 Claims, 4 Drawing Sheets

(56) References Cited

U.S. PATENT DOCUMENTS

| | | | |
|---|---|---|---|
| 7,188,489 B2 | 3/2007 | Martello | |
| 7,246,505 B2 | 7/2007 | Navedo | |
| 7,363,774 B2 | 4/2008 | Urfig | |
| 7,418,832 B2 | 9/2008 | Ferrono | |
| 7,475,563 B2 | 1/2009 | McCarrell | |
| 7,603,875 B2 | 10/2009 | Carr | |
| 7,748,235 B1 | 7/2010 | Franklin | |
| 7,984,624 B2 | 7/2011 | Leitner | |
| 8,016,270 B2 | 9/2011 | Chen | |
| 8,631,665 B1 | 1/2014 | DeClement | |
| 8,925,347 B2 | 1/2015 | Sorola | |
| 8,966,925 B1 | 3/2015 | DeClement | |
| 9,091,449 B2 | 7/2015 | Donaldson | |
| 10,458,664 B2 | 10/2019 | Lee | |
| 10,527,301 B2 | 1/2020 | Schock | |
| 10,690,359 B2 | 6/2020 | McDonald Floyd et al. | |
| 2006/0032259 A1* | 2/2006 | White | F24F 1/0073 62/314 |
| 2008/0271468 A1 | 11/2008 | Monroe | |
| 2009/0044932 A1 | 2/2009 | Blackstone | |
| 2011/0030413 A1 | 2/2011 | Heil | |
| 2013/0233002 A1* | 9/2013 | Donaldson | F24F 1/035 62/99 |
| 2014/0265462 A1* | 9/2014 | Fleming | A47C 1/143 297/180.14 |
| 2015/0291320 A1* | 10/2015 | Ortego | A45C 11/20 383/117 |
| 2017/0370600 A1 | 12/2017 | Duncan | |
| 2018/0299191 A1* | 10/2018 | Taboada | F25D 31/003 |
| 2020/0041149 A1* | 2/2020 | Oakes, III | F24F 13/20 |
| 2021/0325093 A1 | 10/2021 | Rosales | |

OTHER PUBLICATIONS

Ennis, T. “Pressure relief considerations for . . . ” Jan. 2006, Institution of Chemical Engineers . . . vol. 151. [retrieved on Aug. 7, 2025]. Retrieved from Internet <https://www.researchgate.net/publication/287066994_Pressure_relief_considerations_for_low-pressure_atmospheric_storage_tanks> (Year: 2006).*

* cited by examiner

PERSONAL AND PORTABLE MISTING DEVICE

BACKGROUND

Misting devices or systems are well known. Often they are provided on the patios or decks of bars and eating establishments to help cool patrons on hot days. Versions are also available for residential use. These system utilize a plurality of misting nozzles attached by tubing to a water source that create micro droplets of the pressurized sometimes chilled water passing out of them. The micro droplets act to cool the patrons both through lowering the surrounding air temperature through evaporation and by landing on the patrons' skin.

Typically, the prior art misting systems are permanently or semi-permanently installed at a location. The plurality of misting nozzles and the tubing are affixed to one or both of walls, awning framework, and verandas adjacent to or overlying the associated patio or deck. They are mechanically fastened in place by any suitable means. The systems are typically attached to a spigot associated with a building's water supply, and there is an AC powered pump coupled to the tubing to pressurize the water and force it through the nozzles and maximize micro-droplet production. While these systems can be removed for winter storage, they are not designed or practical to be moved regularly as a matter of course from location to location during the warm weather season. Furthermore, they tend to be cumbersome and require the availability of an AC outlet to operate foreclosing their use at locations remote from power, such as in a park or on the beach.

One of the potential problems with a portable misting devices designed and configured for remote use is finding a suitable water supply. Accordingly, there is a need to carry a container of water, which can be cumbersome and heavy. When one considers all the other items, such as a cooler, food, and an umbrella, that might need to be carried to a beach or park picnic site, the additional requirement to provide water for the ostensibly portable misting device can be burdensome.

DETAILED DESCRIPTION

Figure 1:
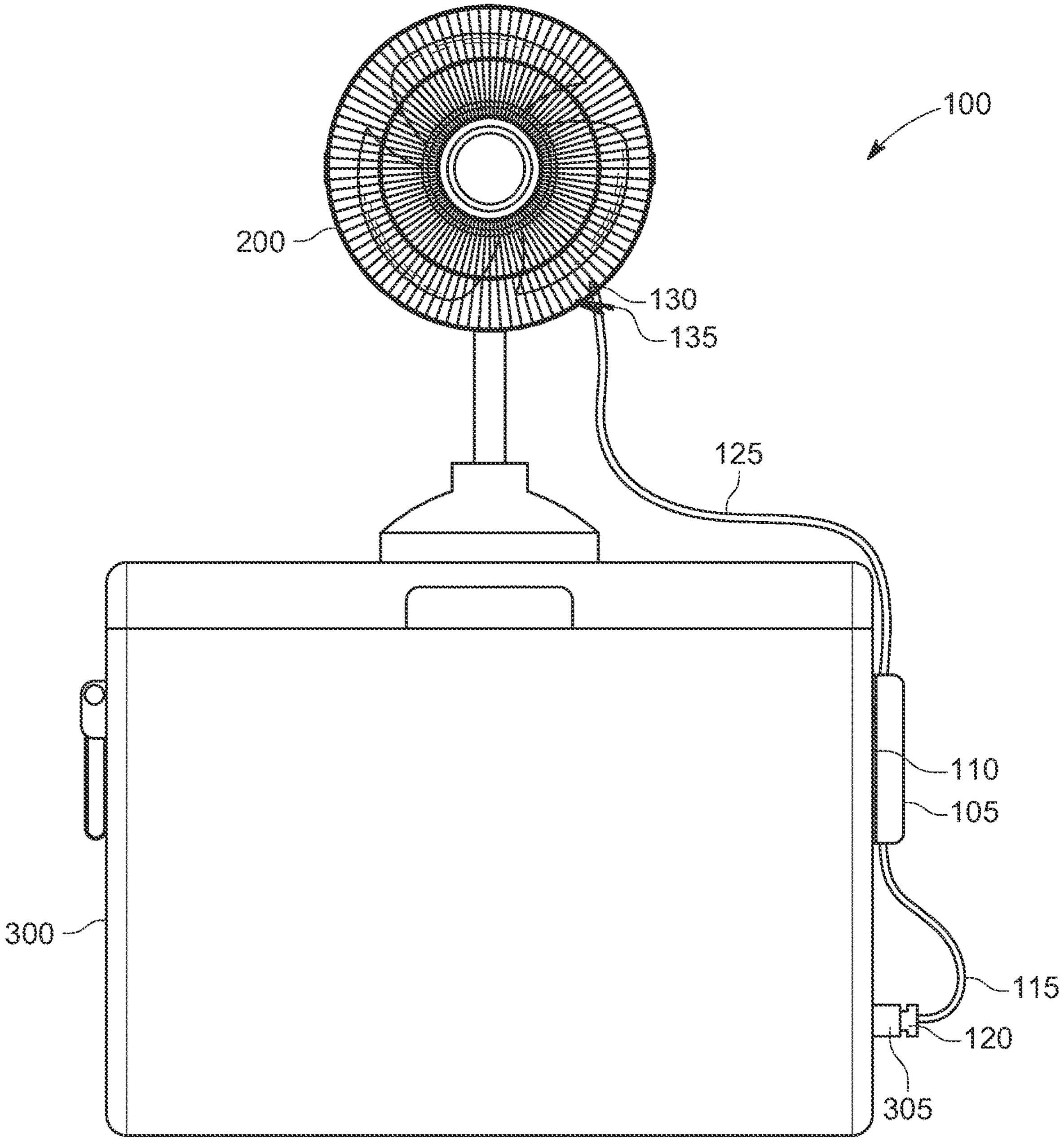
FIG. 1 is a front side view of a portable misting device in combination with a hardsided cooler and a portable fan wherein the inlet tube of the misting device is attached to the drain spout of the cooler to provided chilled water to the misting device according to one embodiment of the present invention.

Embodiments of the present invention as illustrated comprise a personal and portable misting device having at least a pump unit operatively coupled to an inlet tube and an outlet tube with a misting nozzle being attached to the outlet tube. The inlet tube includes a distal end that is to be coupled to a water source. In at least some embodiments, the distal end has a plug attached to it that is designed to be received in the end of a drain spout of a hard-sided cooler to utilize the melted ice-water typically contained in the cooler as the water source. Advantageously, the use of the ice water eliminates the need to carry a separate water source, but rather uses water that is often available at a picnic or beach gathering. Further, while the misting device is in operation, it acts to drain the water from the cooler, which can act to increase the longevity of the remaining ice and the cooling effectiveness of the ice in the cooler.

In at least some embodiments, the drain spout plug, which can be made from an elastomer or a rigid plastic, typically includes two bores that extend from an outside surface of the plug to an inside surface of the plug. One bore is sized to receive the inlet tube and permit the flow of ice water from the cooler to the pump unit. The other bore is typically much smaller in diameter and is sized to receive a small diameter rigid or semi-rigid pressure equalization tube (also referred herein as a vacuum break tube and a pressure equalizing tube) that is configured to extend upwardly within the interior of the hard sided cooler such that the distal end of the tube is positioned above the water level within the cooler.

Many if not most hard-sided coolers provide an air-tight or near air-tight seal when closed and latched to maximize the ability of the cooler to maintain a low temperature within the cooler's interior. As water is pumped out of the cooler by the misting device, the volume of air space within the cooler increases, but because the cooler is air-tight, it is unable to fill the newly created portion of the volume with atmospheric air. Accordingly, the overall pressure within the interior decreases as the air within the interior disperses to fill the additional volume. This creates a vacuum situation wherein the lower interior pressure acts against the pump trying to prevent additional water from being removed from the interior. If the pressure within the interior gets low enough relative to the ambient atmospheric pressure outside the cooler, the pump will be unable to effectively overcome it and the performance of the misting device will be significantly degraded if it can operate at all. By providing a pressure equalization tube, outside air can be drawn into the interior to replace the volume of water pumped therefrom with outside air, and accordingly, maintain ambient atmospheric pressure.

In order for the pump unit to facilitate a completely portable misting device, it is imperative that it can operate off of battery power. In some embodiments, removable or rechargeable batteries can be contained within the pumps housing; however, to provide additional power other embodiments include a USB port to which an external power source, such as a battery pack or even an AC adapter can be attached to one or both power the pump or recharge an internal battery if so equipped. Advantageously, an external power source will also be available to the device's user if need be to recharge a phone or provide power to other devices at a picnic, beach or other site should the need arise.

To further facilitate portable use, the misting nozzle of at least some embodiments is provided with a clip so that it can be attached to a fan, a chair, and umbrella or other article to facilitate directing the mist towards and on a user or in a desired direction. Additionally, a strip of hook and loop material is attached to the surface of the pump unit housing in some embodiments to interface with a corresponding piece of hook and loop material that has been attached to the cooler or another desired surface to neatly and conveniently arrange and position the device.

While on/off switches and pump volume controls can be provided on the pump unit, other embodiments include a wireless receiver, such as a blue tooth receiver, that permit a user from controlling the misting device remotely from a phone or other device using a suitable app running thereon.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Portable Personal Misting Device

Figure 2:
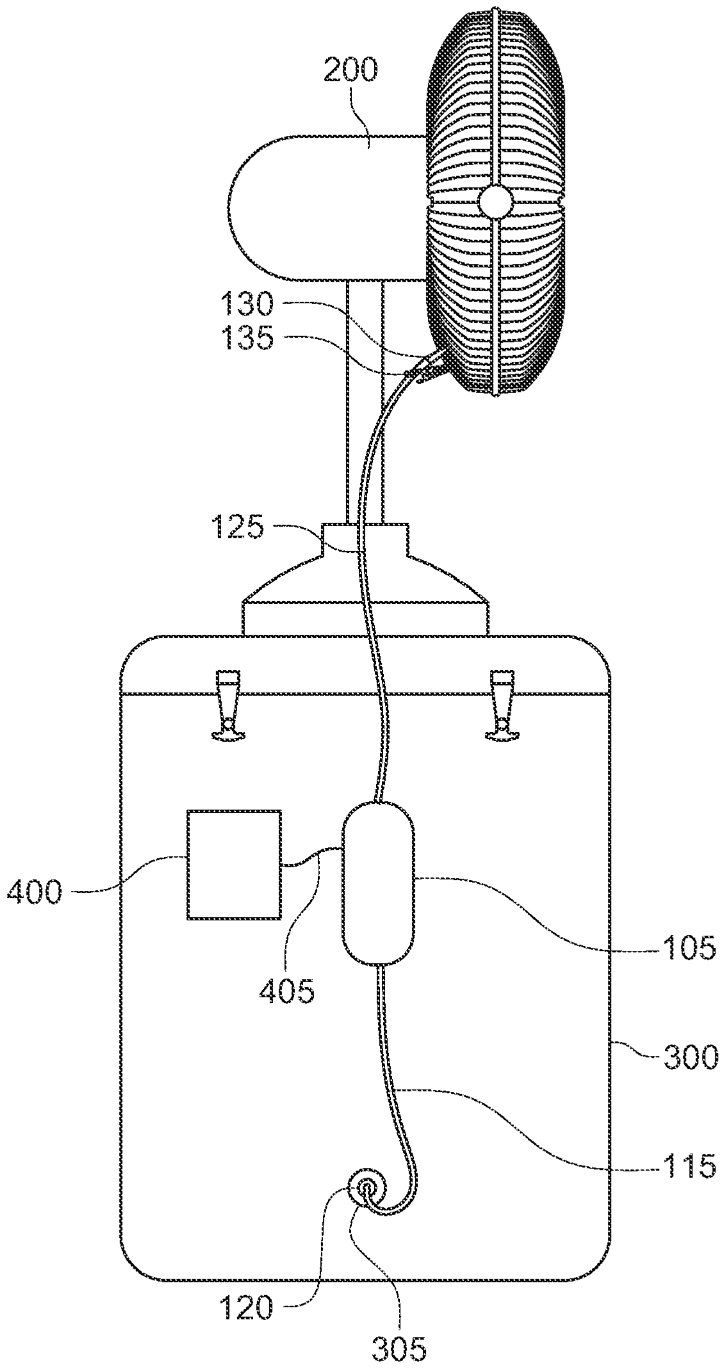
FIG. 2 is a sideview of the combination shown in FIG. 1 further illustrating a portable battery pack electrically coupled to the pump unit of the misting device according to one embodiment of the present invention.

One embodiment of the portable personal misting device 100 is illustrated primarily in FIGS. 1-4. FIGS. 1 & 2 further show the device in combination with a hard-sided cooler 300, a portable fan 200, and a battery pack 400. The misting device comprises a pump unit 105 containing an electrical pump 140, inlet and outlet tubes 115 & 125, a misting nozzle 130 attached to the end of the outlet tube, and a drain spout plug 120, 120*a* configured for receipt in the drain spout 305 of the hard-sided cooler.

Figure 3:
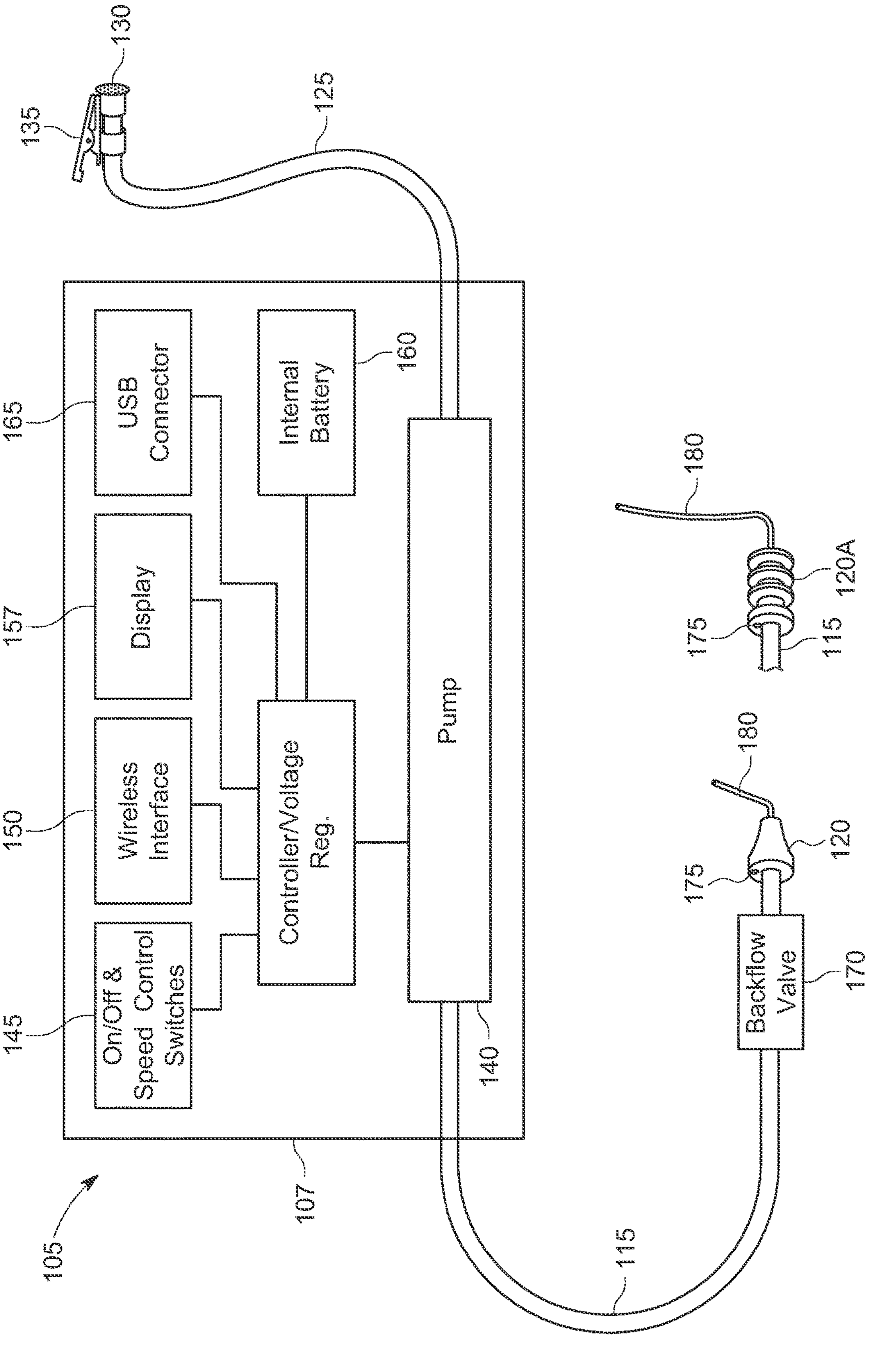
FIG. 3 is an illustration of the portable misting device with the pump unit being shown in block diagram form to illustrate the various components contained within the associated housing according to one embodiment of the present invention.

The pump unit 105 and its internal components are illustrated in block diagram form in FIG. 3. The various components are typically contained within a plastic or metal housing 107. The housing can further have one or more strips of hook and loop material 110 attached thereto (See FIG. 1). Central to the pump unit is an electrical, pump 140 configured to pull and pressurize water from a suitable source in through the inlet tube 115 that is attached to a pump inlet and out a pump outlet that is attached to an outlet tube 125 finally expelling the pressurized water through the misting nozzle 130. The pump is typically DC powered and configured to operate on about 5 volts as provided from an external power source through a universal USB connector 165 or provided by an optional internal battery 160. A voltage regulator/controller 155 can be provided as well to one or both of control the voltage level to the pump (especially if the operational voltage of the pump is more or less than the nominal 5 volts provided through the USB port) and/or coordinate the charging of the internal battery if so equipped. The voltage regulator/controller can also include a timing circuit and use the timer to control the operation of the pump. For instance, the controller may be configured to turn off the pump after a predetermined period of time.

Typically, one or more switches 145 are provided on the housing 107 that are configured to control the operation of the pump 140. For instance, an on/off switch is typically provided. An on/off switch can comprise a variable switch that additionally permits the adjustment of the pump volume or a separate variable switch can be provided for controlling pump volume. As can be appreciated the switch(es) can be operationally coupled to voltage regulator/controller 155 to effect changes to the pump's operation. A display 157 or display lights, such as one or more LEDs, can be provided to provide the user with information concerning the unit's operation. Also, a wireless interface 150 (or receiver) can be provided permitting wireless control of the electric pump. Although not specifically shown, the pump or the associated components may include a failsafe switch that senses whether the pump is pumping water and shuts the pump off if it is not to prevent pump overheating and failure.

As mentioned an outlet tube 125 is connected with and extends from a pump outlet. The outlet tube 125 (and the inlet tube as well) typically comprise a suitable length of flexible tubing that is sized based on the capabilities of the associated pump 140. A misting nozzle 130 is provided on the distal end of the outlet tube. The size and specific configuration of the nozzle can vary based on the capabilities of the pump 140, such as the water pressure and flow volume provided at the nozzle. As shown, the nozzle may also include an integral clip, or a separate clip 135 can be provided that is coupled to the outlet tube generally proximate the nozzle. As shown in FIGS. 1 & 2, the clip can be used to couple the nozzle on the protective cage of a portable fan 200, such that the air blown from the fan can be used to disperse microdroplets emanating from the nozzle. Further, the clip can be used to attach the nozzle to any suitable article.

The inlet tube 115 extends from the pump inlet to a drain spout plug 120, 120*a* in most variations of the present embodiment. The tube is generally similar to the outlet tube except in some variations it includes a backflow valve 170 that prevents water contained in the tube from flowing back into the cooler if the pump 140 is turned off.

Figure 4:
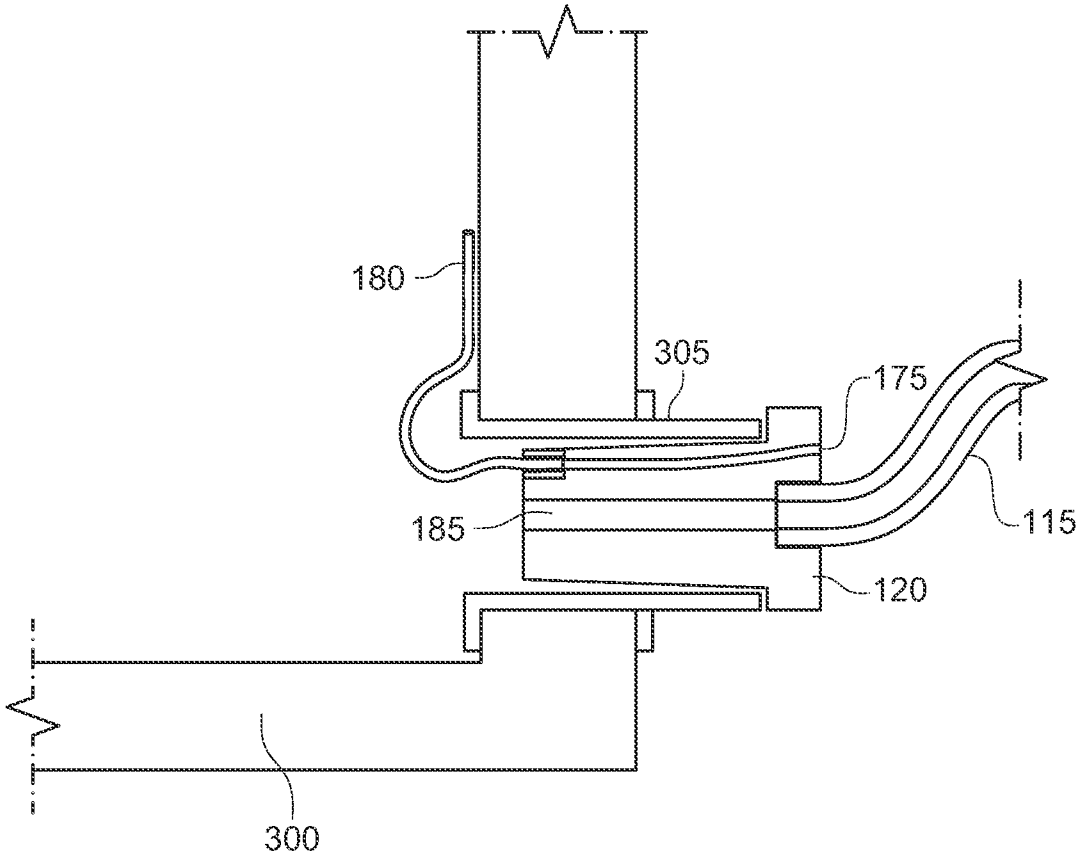
FIG. 4 is a cross sectional view of drain spout plug received in a drain spout of a hard-sided cooler according to one embodiment of the present invention.

Two different drain spout plugs 120 & 120*a* are shown in FIG. 3: a tapered elastomeric plug 120 and a rigid plastic plug 120*a* with flexible resilient radial flanges. Either style can be utilized although the tapered elastomeric plug can be used on a greater number of differently sized spouts 305; whereas, the rigid plug is more suited to a specific size spout. The cross sections of both plugs as it pertains to the bores 175 & 185 extending through the plugs and the connection with the inlet tube 115 and the pressure equalization tube tube 180 are similar as shown in FIG. 4. The inlet tube bore 185 is sized to receive the inlet tube and permit the flow of ice water from the cooler to the pump unit 105. The pressure relief bore 175 is typically much smaller in diameter and is sized to receive a small diameter rigid or semi-rigid pressure equalization tube 180 that is configured to extend upwardly within the interior of the hard sided cooler 300 such that the distal end of the tube is positioned above the water level within the cooler.

For the pressure equalization tube 180 to properly perform its function, it is imperative that the tube's distal end be located above the water line within the cooler 300 such that the tube provides a free path for air to pass from outside the cooler to its interior. Accordingly as illustrated, the typically rigid or semi-rigid tube extends radially outwardly of the plug 120 and ideally generally orthogonally relative to the axis of the plug. The pressure equalization tube elastically bends when the plug is inserted within the spout but springs back as necessary once the plug is seated. The user rotationally positions the plug so the pressure equalization tube extends upwardly within the interior and so the distal end is sufficiently above the water line. Typically, the tube has a length of at least 1.5" In some embodiments, the outwardly extending portion of the pressure equalization tube is canted back towards the plug so when it is inserted within the cooler it is biased against the adjacent interior wall of the cooler as best shown in FIG. 4. This hinders the chance that the tube will be jostled or moved by impact with the contents of the cooler.

As can be appreciated the design of the connector operatively joining the inlet tube 115 to the drain spout 305 of a cooler 300 can vary significantly from the specific plugs illustrated herein. For instance, a connector can comprise an elastomeric tube that can be received over a spout that extends from the side of the cooler. Further, other types of connectors or end fittings can be provided to permit a user to couple the misting devices to other water sources. For instance, the connector can be dispensed with entirely and replaced by a filter element designed to be lowered into any suitable container of water, such as a pail. In yet another variation the connector can comprise a cap designed to be threadably received on top of a water bottle container with a tube that extends into the water bottle to suck the water therefrom and an pressure equalization bore through the cap to prevent the creation of a vacuum. Another connector can comprise a piece that fits over the end of a household faucet or a threaded connector that is received on a typical outdoor spigot.

The Combination of the Misting Device and a Cooler

As mentioned FIGS. 1 & 2 show the misting device 100 in combination with the hard-sided cooler 300 as well as a fan 200. It is appreciated that the cooler and misting device combination can and will be often used without the fan wherein the misting nozzle 130 is positioned proximate and facing a person to be cooled. For instance in a beach setting, the nozzle can be clipped or otherwise coupled to a shading umbrella located above a user with the nozzle directed to rain down microdroplets toward the user. In yet other variations, the misting device may include a stand or a stake on to which the misting nozzle can be attached to an upper end thereof and positioned to direct microdroplets in a desired direction.

As shown, the pump unit 105 is often removably attached to the cooler using corresponding hook and loop strips 110. Typically, a first strip is adhered to cooler and a second corresponding strip is adhered to the pump unit housing 107. Often the attachment location is on the same side of the cooler that includes the cooler's drain spout 305.

The inlet tube 115 is coupled on one end to the pump unit 105 and on the other end to the drain spout 305 by way of an associated plug 120, 120*a* or other suitable connecter. Where the hard sided cooler 300 forms a substantially airtight seal when closed, a pressure equalizing tube 180 can be provided as part of the plug or connector. The plug or connector is positioned in the spout so that the pressure equalizing tube faces upwardly to ensure its distal end remains above any water line that forms in the cooler as the resident ice melts.

The outlet tube 125 is coupled on one end to the pump unit and on the other end to the misting nozzle 130. The nozzle typically includes or is located proximate a clip 135 that can be used to attach the nozzle or tube proximate the nozzle to any suitable article, such as but not limited to the portable fan 200 as shown. Other types of connectors can be provided other than clips in variations. For instance, one type of alterative connector can comprise a malleable wire that can be wrapped around a pole or post. Another suitable connector could comprise a magnet. Yet another could comprise hook and loop material. Further in some variations, a clip or connector may not be specified at all wherein the user holds the outlet tube and directs the misting nozzle toward the portion of his/her body he desires to cool.

As described above, some variations of the misting device include an internal battery 160 contained in the pump unit 105 although in other variations no internal battery is provided. Rather, the pump unit in these variations are configured to receive power through a provided USB port 165. The port can receive any suitable USB power source by way of a USB cord including AC adapters and, more typically, a rechargeable battery pack 400 as our often used to recharge phones. The battery pack can also be coupled to the side of the cooler 300 in much the same manner that the pump unit is attached to the cooler using hook and loop strips. As can be appreciated, in variations of the pump unit including an internal battery the USB connector can still be provided as a means to recharge the internal battery and as a means to provide supplementary power. As can be appreciated, other types of electrical connectors can be specified as well in other variations.

To use the cooler and misting device combination, the user verifies that there is water pooled in the bottom of the cooler 300. He/she then turns the pump unit 105 on and adjusts the pumps pumping rate to a desired level. Depending on the variation, this can be done by activating switches 145 on the pump unit 105 or in some variations this may be accomplished wirelessly by way of an app running on a phone or tablet. The user than positions the misting nozzle 130 in a desired position to provide cooling.

Alternative Variation and Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance, the drain spout plug 120 can be used individually from the mister as a means for equalizing pressure in coolers that have lids that essentially form an air-tight seal. As can be appreciated with these types of cooler, when the ice melts and drains from the drain spout, a vacuum is created in the air space that could make opening the lid difficult. By using the present plug installed in the cooler, as water is drained pressure equalizing air is drawn into the cooler's air space by way of the pressure equalizing tube 180. In some variations of the stand alone plug, a cap or valve may be provided to selectively seal the drain spout plug.

I claim:

1. A personal misting device for attachment to a drain spout of a hard sided cooler, the misting device comprising:

a pump unit having a housing, an electric pump, and a power connector for coupling to a DC power source;

a misting head;

a cooler drain spout connector including (i) a drain spout plug with proximal and distal ends, a longitudinal length defining a longitudinal axis and first and second bores extending from the proximal plug end to the distal plug end, and (ii) a pressure equalization tube (a) being partially received in the first bore at the distal end, (b) having a length of at least 1.5", (c) extending outwardly relative to the longitudinal axis and being canted back towards the drain spout plug, and (d) having a distal open tube end;

an outlet tube having a first end coupled to the electric pump and a second end coupled to the misting head; and an inlet tube having a first end coupled to the electric pump and a second end coupled to the second bore of the cooler drain spout plug at the proximal end.

2. The personal misting device of claim 1, wherein the pump unit further comprises a rechargeable battery contained within the housing.

3. The personal misting device of claim 1, wherein the pump unit further comprises one or both of an on/off switch and a flow level switch.

4. The personal misting device of claim 1, wherein the power connector comprises a USB connector.

5. The personal misting device of claim 1, wherein the pump unit further includes a controller including a timing circuit configured to control the period of time the pump is active.

6. The personal misting device of claim 1, wherein the pump unit further comprises a wireless receiver permitting wireless control of the electric pump.

7. The personal misting device of claim 1, further comprises a misting head connector located at or proximate the misting head.

8. The personal misting device of claim 7, wherein the misting head connector comprises a clip.

9. The personal misting device of claim 1, further comprises one of a hook and loop material strip mounted to the housing.

10. The personal misting device of claim 1, wherein the drain spout plug is elastomeric.

11. The personal misting device of claim 1, wherein the drain spout plug is comprised of a rigid plastic.

12. The personal misting device of claim 1, wherein the diameter of the pressure release tube is smaller in diameter than the inlet tube.

13. The personal misting device of claim 1, wherein the inlet tube further includes a back flow prevention valve.

14. The personal misting device of claim 4 in combination with a rechargeable battery pack and a USB cable, the USB cable being electrically coupled with the battery pack and the power connector.

15. The combination of claim 14, further including the hard sided cooler, the drain spout plug being received in the drain spout with the pressure equalization tube extending upwardly within an interior of the hard sided cooler.

16. The combination of claim 14, wherein pump assembly is removably mounted to the hard side cooler with hook and loop material.

17. The combination of claim 16, further including a fan wherein the misting head is removably coupled with the fan with a clip.

18. A personal misting device for attachment to a drain spout of a hard sided cooler, the misting device comprising:

a pump unit having and a housing, an electric pump, a USB connector for coupling to a DC power source, an on/off switch, and a controller, the controller being configured to manage the operation of the pump;

a misting head;

a cooler drain spout connector including (i) a drain spout plug with proximal and distal ends, a longitudinal length defining a longitudinal axis and first and second bores extending from the proximal end to the distal end, and (ii) a pressure equalization tube (a) being partially received in the first bore at the distal end, (b) having a length of at least 1.5", (c) extending outwardly relative to the longitudinal axis and being canted back towards the drain spout plug, and (d) having a distal open tube end;

an outlet tube having a first end coupled to the electric pump and a second end coupled to the misting head;

an inlet tube having a first end coupled to the electric pump and a second end coupled to the second bore of the cooler drain spout plug at the proximal end; and a clip located proximate the misting head for securing the outlet tube and/or misting head to a desired article.

19. The personal misting device of claim 18 in combination with a rechargeable battery pack, a USB cable and the hard sided cooler, wherein (i) the drain spout plug is received in the drain spout with the pressure equalization tube extending upwardly within an interior of the hard sided cooler, and (ii) the USB cable is electrically coupled with the battery pack and the power connector.

* * * * *